United States Patent Office 2,815,117
Patented Dec. 3, 1957

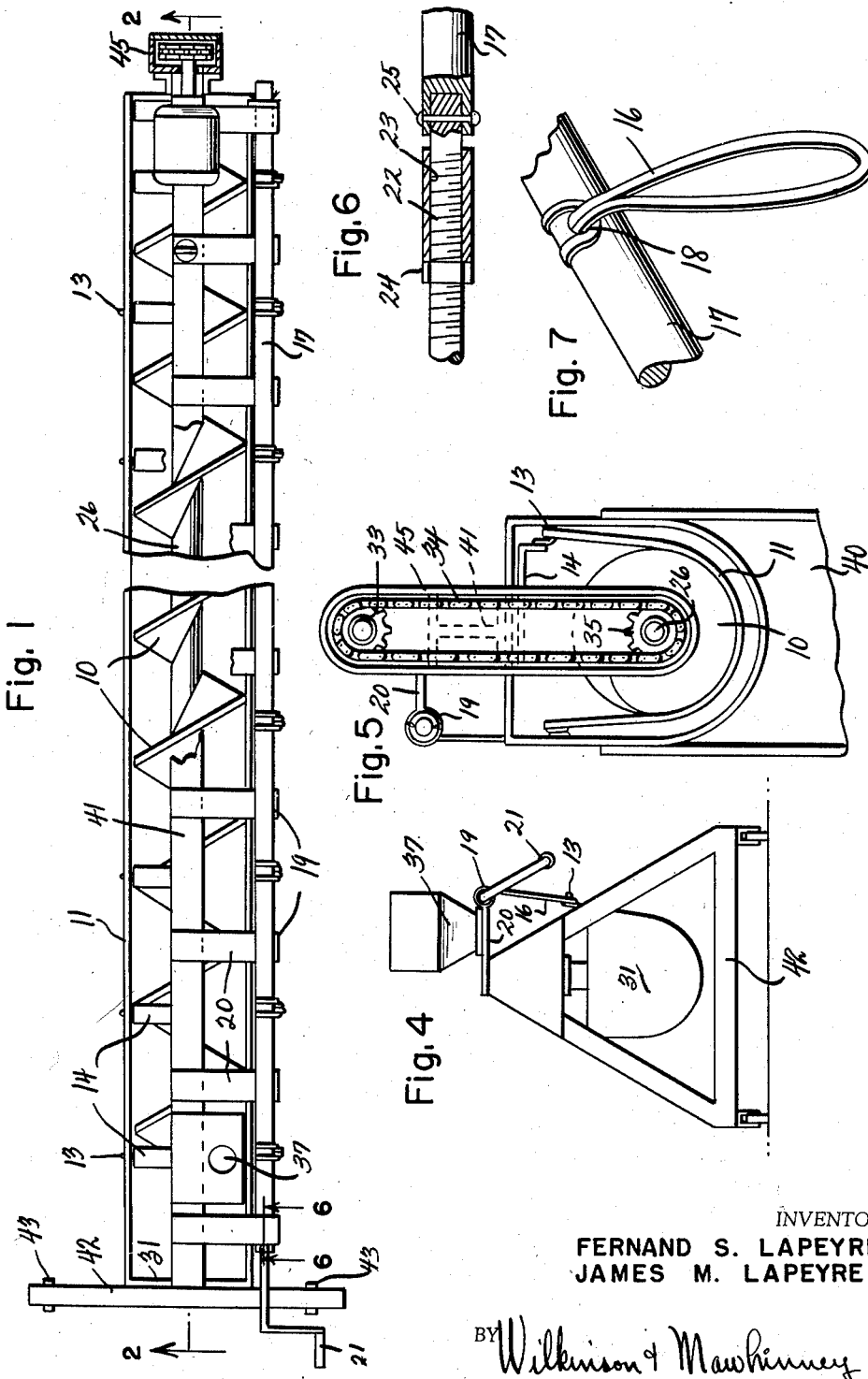
Dec. 3, 1957    F. S. LAPEYRE ET AL    2,815,117
LIQUID FLOTATION CONVEYOR FOR SHRIMP AND THE LIKE
Filed June 15, 1954    2 Sheets-Sheet 1
INVENTOR
FERNAND S. LAPEYRE
JAMES M. LAPEYRE
BY Wilkinson & Mawhinney
ATTORNEYS

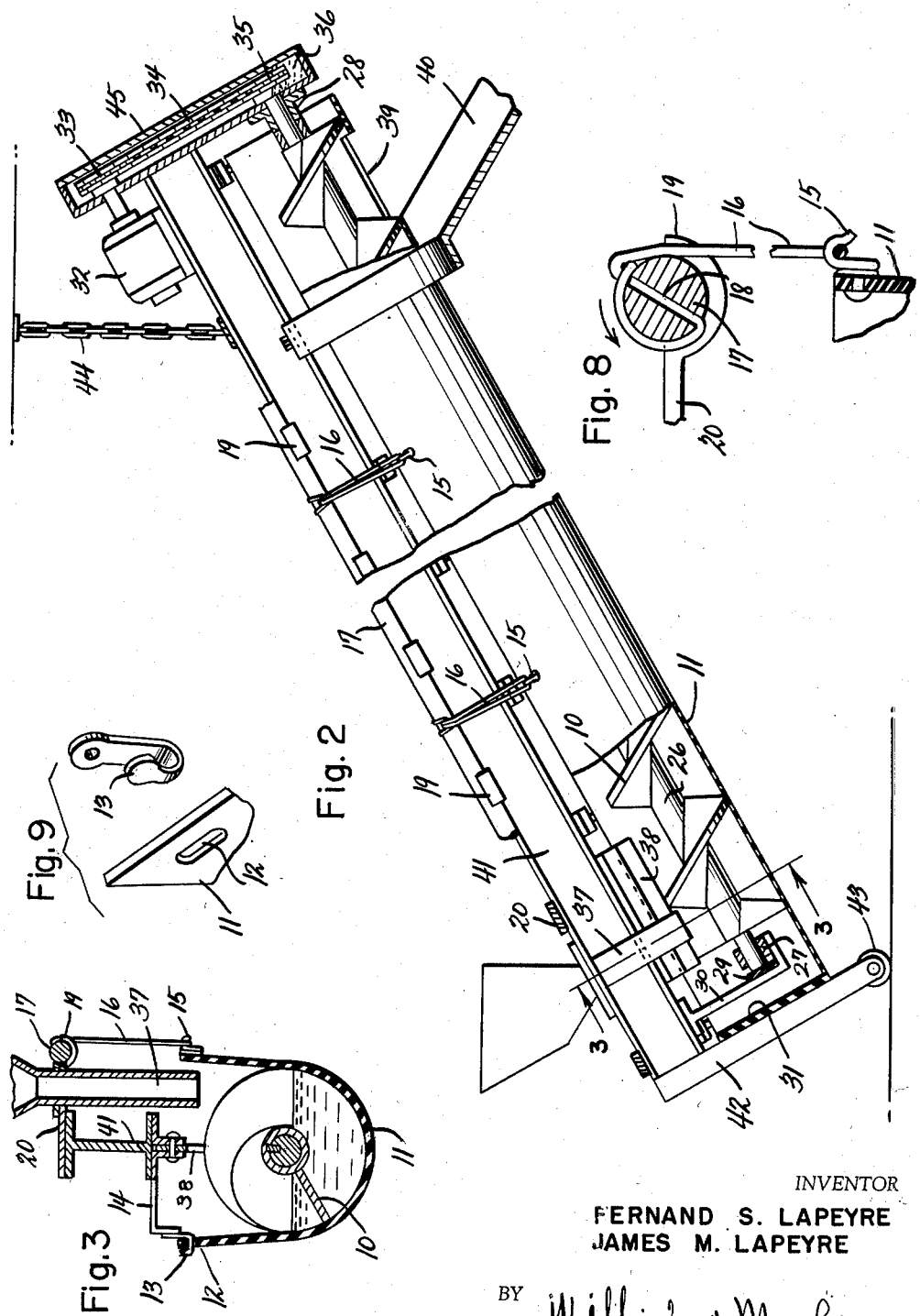

2,815,117

LIQUID FLOTATION CONVEYOR FOR SHRIMP AND THE LIKE

Fernand S. Lapeyre and James M. Lapeyre, New Orleans, La., assignors to The Peelers Company, Houma, La., a partnership of Louisiana Application June 15, 1954, Serial No. 436,787

2 Claims. (Cl. 198—213)

The present invention relates to liquid flotation conveyor for shrimp and the like and more particularly refers to an elevating conveyor adapted to receive peeled shrimp from a peeling machine such as forms the subject matter of the application of Robert J. Samanie, Serial No. 323,988, filed December 4, 1952, and now Patent No. 2,694,218, and raising the peeled or shelled shrimp to an elevation for delivering the same to a shrimp de-veining machine such as that forming the subject matter of our co-pending application Serial No. 305,184, filed August 19, 1952, and now Patent No. 2,755,501, in which the shrimp slide by gravity down an inclined table and against inclined knife edges for severing the membrane at the back of the shrimp which releases the veins or alimentary canals of the shrimp for removal from the peeled shrimp in a subsequent operation.

The problem is to integrate an elevating conveyor in other related operations for preparing raw shrimp for the market. Conventional types of conveyors will perform the task of elevating the shrimp but after peeling, the meat is delicate and it cannot withstand rubbing or dragging against metallic surfaces such as incident to movement through a screw conveyor and over the ordinarily metallic casing or tube of such a conveyor without the impairment of the meat which reduces its value as a commercial commodity.

Accordingly, an object of the invention is to provide a conveyor in which the shrimp meat will pass through the conveyor with a substantially complete elimination of any contact with any of the parts of the conveyor, at least from any such rubbing or dragging contact as would multilate, distort or otherwise devalue such meat, and to this end the shrimp are substantially floated in a puddle or pocketed volume of water passing through the conveyor.

A second problem arises from the fact that in the subsequent de-veining machine the shrimp must retain their mucous envelope in order that they may slide down the table or trough readily and with a sufficient speed to sever the rear membranes when striking the knives.

Accordingly, it is still a further object of the invention to avoid contact of the shrimp meat as far as possible during the conveying stage with any surfaces that would tend to rub or otherwise remove this mucous or lubricating envelope or tissue.

It is a further object of the invention to provide an elevating conveyor for shrimp in the relation above stated in which the trough of the conveyor is flexible and preferably resilient and is held in such a manner against the flights of the conveyor as to form a liquid-tight seal to entrap liquid in the flights in which the shrimp are floated through the conveyor and to the de-veining machine.

A still further object of the invention is to provide a conveyor in which yieldable means are associated with a flexible and preferably resilient conveyor trough member or wall for enabling the wall to be subjected locally at all points to the constant load of the resilient means by which to retain the wall or trough in liquid-tight engagement with the outer edges of the flights.

Other objects of the invention are to provide a mobile conveyor unit which may conveniently take its place between a peeling machine and a de-veining machine and which is readily adjustable as to inclination and embodies means for the adjustment of the load to be placed upon the rubber or other blanket which forms the trough or casing wall of the screw conveyor.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a top plan view of a liquid flotation conveyor for shrimp and the like constructed in accordance with the present invention.

Figure 2 is a longitudinal sectional view taken on the line 2—2 in Figure 1 and shown on an inclination in a position of use.

Figure 3 is a transverse sectional view taken on the line 3—3 of Figure 2.

Figure 4 is an end elevational view taken from the lower end of the conveyor.

Figure 5 is a front elevational view taken from the upper end of the device with the gear cover removed.

Figure 6 is a longitudinal sectional view taken on an enlarged scale on the line 6—6 of Figure 1.

Figure 7 is a fragmentary perspective view of the adjusting shaft and a form of rubber band which may be employed.

Figure 8 is a fragmentary sectional view taken through the adjusting shaft and showing the rubber band as connected to the conveyor trough wall, and Figure 9 is a fragmentary view of the resilient trough wall showing an eyelet and a hook for suspending the trough wall along one side of the conveyor.

Referring more particularly to the drawings, 10 designates an Archimedean or screw conveyor having flights of suitable pitch and 11 represents a flexible trough wall extending about the lower portion and sides of the conveyor 10. Such wall may be of sheet rubber, either natural or synthetic, or the like so as to be preferably both flexible and locally resilient so that the wall may conform very accurately to the curvature of the edges of the conveyor flights 10 and form liquid seals at the areas of contact. This flexible trough wall or blanket 11 may be suspended fixedly along one edge thereof as by providing eyelets 12 along the edge of such wall 11 adapted to be received over hooks 13 carried by supports 14 which are spaced along the length of the conveyor 10.

At the opposite free longitudinal edge of the trough wall 11 are a number of hooks 15 spaced at suitable intervals and having downturned bills. These hooks are adapted to receive the lower loops of rubber or other resilient bands 16 which may be supported at their upper ends in any suitable manner preferably adjustably from a rotary shaft 17. The shaft has diametric apertures therethrough spaced along its length to receive the rubber bands which after passing therethrough are looped over the dependent portions of the bands as indicated in Figures 7 and 8. The bands 16 thus resiliently support the resilient trough wall 11 and in fact exert a considerable resilient load thereupon tending to draw the flexible and resilient blanket closely about the lower portion and sides of the conveyor 10 in a liquid-tight manner.

The adjusting shaft 17 may be journalled in bearings 19 supported in brackets 20. A crank handle 21 preferably at the lower end of the shaft 17 provides for the convenient rotation of the shaft to wind the upper portions of the rubber bands thereabout for the purpose of increasing the tension on the blanket 11.

One form of connection between the crank 21 and the shaft 17 is shown in Figure 6 in which the threaded shank 22 of the handle 21 is entered into a threaded socket 23 of the shaft 17, the adjustment being maintained by either or both a lock nut 24 threaded on the shank 22 and a pin 25 passing through both shaft and shank.

The conveyor shaft 26 may be appropriately journalled in a lower pillow block bearing 27 and in an upper suitable bearing 28. The lower end of the shaft 26 which is inclined in use may rest against a thrust pad 29 carried by the lower end of a bracket 30 which also supports the bearing 27. The lower end of the internal space of the conveyor may be closed by a lower end wall 31.

A motor 32 is mounted above the upper portion of the upper part of the conveyor with its armature shaft in relation to drive an upper sprocket 33 over which is trained a chain 34 also engaged with a lower sprocket 35 on the upper end of the conveyor shaft 26. A gear case 45 houses the sprocket and chain gearing and provides in the lower portion thereof an oil sump or well 36.

A load spout 37 enters the boot or lower portion of the conveyor through the open upper portion thereof at which point is located a wiper blade 38 extending longitudinally of the conveyor and, as shown in Figure 3, bearing upon the outer edges of the flights for a distance, for example of twelve feet, measured parallel to the axis of the conveyor.

At the upper under portion of the conveyor is an outlet 39 below which is positioned a discharge chute 40 for directing the shrimp meat to the upper portion of the de-veining table.

All of these various parts may be compactly grouped to be supported by an I-beam 41 or other backbone member to the lower end of which is connected an end frame 42 which may be substantially an A-frame as shown in Figure 4. Such a frame provides a lower wide base for support at widely separated points by rollers or casters 43 upon which the entire conveyor may be supported for rolling movement from place to place and upon which the same may be tilted to the desired angle. The upper end of the device may be adjustably supported by a chain or the like 44.

In the use of the device raw shrimp subsequent to peeling or shelling are delivered to the down load spout 37 and thus introduced into the lower portion of the conveyor. Quantities of water used to wash the shrimp through the peeling machine are introduced with the shrimp so that pools of water are entrained by the flights of the conveyor 10 in which quantities of the peeled shrimp meat are contained in floating or buoyant condition. Figure 3 shows how the liquid pools are maintained between the flights by the resilient blanket or trough wall 11 which seals the spaces between the flights and causes the water to be elevated with the shrimp floating therein without bringing the shrimp into any but momentary contact with the surfaces of the flights or with portions of the blanket 11. The shrimp meat is thus elevated to the top of the conveyor without being subjected to any rubbing or dragging with friction over any relatively immovable surfaces which would be apt to deprive the shrimp of its mucous envelope or which would be apt to crush, mar or disfigure the shrimp.

The shrimp are delivered to the upper end 39 and slide down the chute 40 to the subsequent operation of de-veining.

Should the blanket 11 locally sag at any time due to the weight of the pools of water and entrained shrimp, the shaft 17 may be given a partial turn in the direction of the arrow in Figure 8 so as to partially wind the rubber bands 16 thereon so as to exert an upward pull on the free longitudinal edge of the blanket and to place the blanket under greater tension so that it will adhere more closely to the peripheral edges of the flights.

Accordingly, the shrimp are substantially floated up the conveyor without injury and without loss of mucous envelope.

While the device has been described as an elevating conveyor for shrimp, and in a particular relation with respect to companion machines, it is obvious that the device may be used for the movement or elevation of shrimp or other materials wherever movement of the same is desired.

As illustrative of a variety of products which might be effectively moved or elevated by the device according to the invention, the following might be enumerated: peaches, apricots, tangerines, oysters (after removal from shells), jello, soup, vegetables, concrete, peas, beans, etc.

Although we have disclosed herein the best form of the invention known to us at this time, we reserve the right to all such modifications and changes as may come within the scope of the following claims.

What is claimed is:

1. A flotation conveyor for shrimp or the like comprising a rotatable screw, a backbone support for rotatably receiving the screw, a unitary resilient blanket, blanket anchoring means extending off one side of the backbone, means for adjusting the tension on the blanket, means extending off the backbone for supporting the adjusting means, and drive means for the screw carried by the backbone.

2. A flotation conveyor for shrimp being conveyed by a fluid comprising a rotatable Archimedean screw, a back bone support rotatably receiving said screw, a unitary resilient blanket, blanket anchoring means at one side of said blanket adapted to be secured to said back bone in non-yielding engagement therewith, blanket tension adjusting means associated with the unanchored side of said blanket and said back bone whereby said blanket is maintained in fluid tight engagement with the flights of the screw to permit the screw to convey shrimp along the screw in a fluid medium without multilating the shrimp meat.

References Cited in the file of this patent

UNITED STATES PATENTS 2,697,510    Morrison  _____ Dec. 21, 1954